United States Patent
Sugiyama et al.

(10) Patent No.: US 7,877,165 B2
(45) Date of Patent: Jan. 25, 2011

(54) HANDSHAKE LEGGED MOBILE ROBOT CONTROL SYSTEM

(75) Inventors: Kenichiro Sugiyama, Wako (JP); Taro Yokoyama, Wako (JP); Koji Maki, Wako (JP); Naohide Ogawa, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 810 days.

(21) Appl. No.: 11/297,363

(22) Filed: Dec. 9, 2005

(65) Prior Publication Data

US 2006/0129278 A1    Jun. 15, 2006

(30) Foreign Application Priority Data

Dec. 14, 2004   (JP)   ............................. 2004-361711

(51) Int. Cl.
*G05B 19/00*   (2006.01)

(52) U.S. Cl. ...................... 700/245; 700/254; 700/258; 901/1; 901/2; 901/33; 318/568.11

(58) Field of Classification Search ................... 700/71, 700/245, 246, 250, 253, 254, 258, 279; 901/2, 901/33, 45, 48; 318/568.11, 568.16, 568.2, 318/568.21

See application file for complete search history.

(56) References Cited

U.S. PATENT DOCUMENTS

| | | | | |
|---|---|---|---|---|
| 5,513,106 | A * | 4/1996 | Yoshino et al. | 701/23 |
| 6,421,453 | B1 * | 7/2002 | Kanevsky et al. | 382/115 |
| 6,505,096 | B2 * | 1/2003 | Takenaka et al. | 700/245 |
| 2002/0068996 | A1 * | 6/2002 | Hirose | 700/245 |
| 2004/0101192 | A1 * | 5/2004 | Yokoyama | 382/153 |
| 2007/0150107 | A1 * | 6/2007 | Ogawa et al. | 700/245 |

FOREIGN PATENT DOCUMENTS

| | | |
|---|---|---|
| JP | 10-230485 | 9/1998 |
| JP | 10-277969 | 10/1998 |
| JP | 2003-117858 | 4/2003 |
| JP | 2003-191188 | 7/2003 |
| JP | 2004-283975 | 10/2004 |
| JP | 2004-302905 | 10/2004 |

OTHER PUBLICATIONS

Introducing a New ASIMO Featuring Intelligence Technology, Dec. 5, 2002, Honda.*

(Continued)

*Primary Examiner*—Khoi Tran
*Assistant Examiner*—Spencer Patton
(74) *Attorney, Agent, or Firm*—Squire, Sanders & Dempsey, LLP (57) ABSTRACT

In a legged mobile robot control system having leg actuators each driving the individual legs and arm actuators each driving the individual arms, an external force acting on the right arm is detected, operation of the right arm actuators is controlled to produces a handshake posture, and operation of the leg actuators is controlled based on the detected external force acting on the right hand during handshaking, thereby improving communication capability by enabling it to shake hands with humans and to maintain a stable posture during the handshaking.

12 Claims, 9 Drawing Sheets

OTHER PUBLICATIONS

Maki et al, "The Role of Limb Movements in Maintaining Upright Stance: The 'Change-in-Support' Strategy," May 1997, Physical Therapy, vol. 77, No. 5, pp. 488-507.*

Komura, Taku, "A Feedback Controller for Biped Humanoids that Can Counteract Large Perturbations During Gait," Mar. 24, 2004, City University of Hong Kong.*

Miyashita et al, "Human-Like Natural Behavior Generation Based on Involuntary Motions for Humanoid Robots," Sep. 9, 2004, Robotics and Autonomous Systems 48, pp. 203-212.*

Kuwamoto, Misuzu; Let's Paly with ASIMO in the Twin Ring Motegi; ASCII 24 news; Japan; ASCII Media Works; Aug. 6, 2001; URL.

* cited by examiner

HANDSHAKE LEGGED MOBILE ROBOT CONTROL SYSTEM

BACKGROUND OF THE INVENTION

1. Field of the Invention

This invention relates to a legged mobile robot control system, particularly to a system for controlling a legged mobile robot that is equipped with legs and arms attached to a body to be able to move by driving the legs, and to operate the arm to shake hands with a person.

2. Description of the Related Art

The prior art includes robots made capable of shaking hands with people so as to upgrade their ability to communicate with human beings, as taught by, for example, Japanese Laid-Open Patent Application No. 2004-283975, particularly paragraphs 0062 to 0066 and FIGS. 8 and 9. The robot taught by this reference has a pressure sensor embedded in its hand. During handshaking with a person, the person's gripping force is detected to make different utterances depending on the intensity of the detected gripping force. (It says "How do you do?" when the force is about right and "Ouch" when it is too strong.) It is also controlled to make an associated arm movement (pull its arm and hand inward when the gripping force is strong). These responses are intended to improve the robot's ability to communicate. (The robot of this reference is a wheeled mobile robot.)

When a robot is controlled to shake hands with a person, its arm receives a considerable external force. This does not cause a particular problem in the case of the robot set out in the reference because it is configured to move on wheels, so that it stay posturally stable despite the external force acting on its arm during handshaking. However, the external force applied by handshaking may well be strong enough to disturb the posture of a legged mobile robot, particularly a biped robot, that moves by driving legs. In other words, the posture of the legged mobile robot is liable to be destabilized by the action of shaking hands with a human.

SUMMARY OF THE INVENTION

An object of this invention is therefore to overcome this drawback by providing a legged mobile robot control system that is improved in communication capability by enabling it to shake hands with humans and can maintain a stable posture during the handshaking.

In order to achieve the object, this invention provides a system for controlling a legged mobile robot having a body, legs and arms each connected to the body, leg actuators each driving the individual legs and arm actuators each driving the individual arms, comprising: force sensor detecting an external force acting on each of the arms; an arm operation controller controlling operation of at least one of the arm actuators such that one of the arms produces a handshake posture; and a leg operation controller controlling operation of the leg actuators based on the detected external force acting on the one of the arms.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A legged mobile robot control system according to an embodiment of this invention will be explained with reference to the attached drawings in the following.

Figure 1:
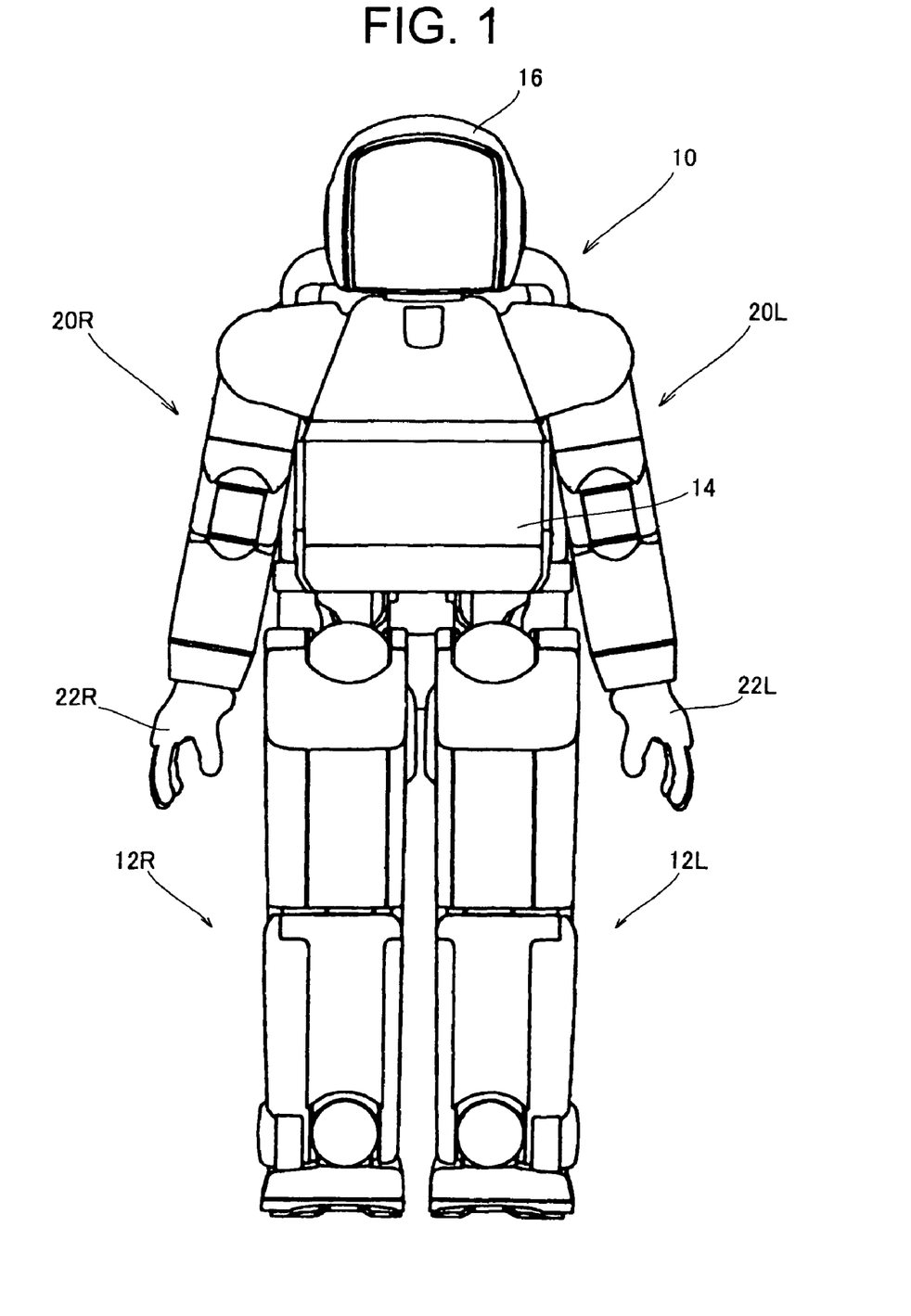
FIG. 1 is a front view of a robot, specifically a legged mobile robot, for which a legged mobile robot control system according to an embodiment of this invention is applied.
Figure 2:
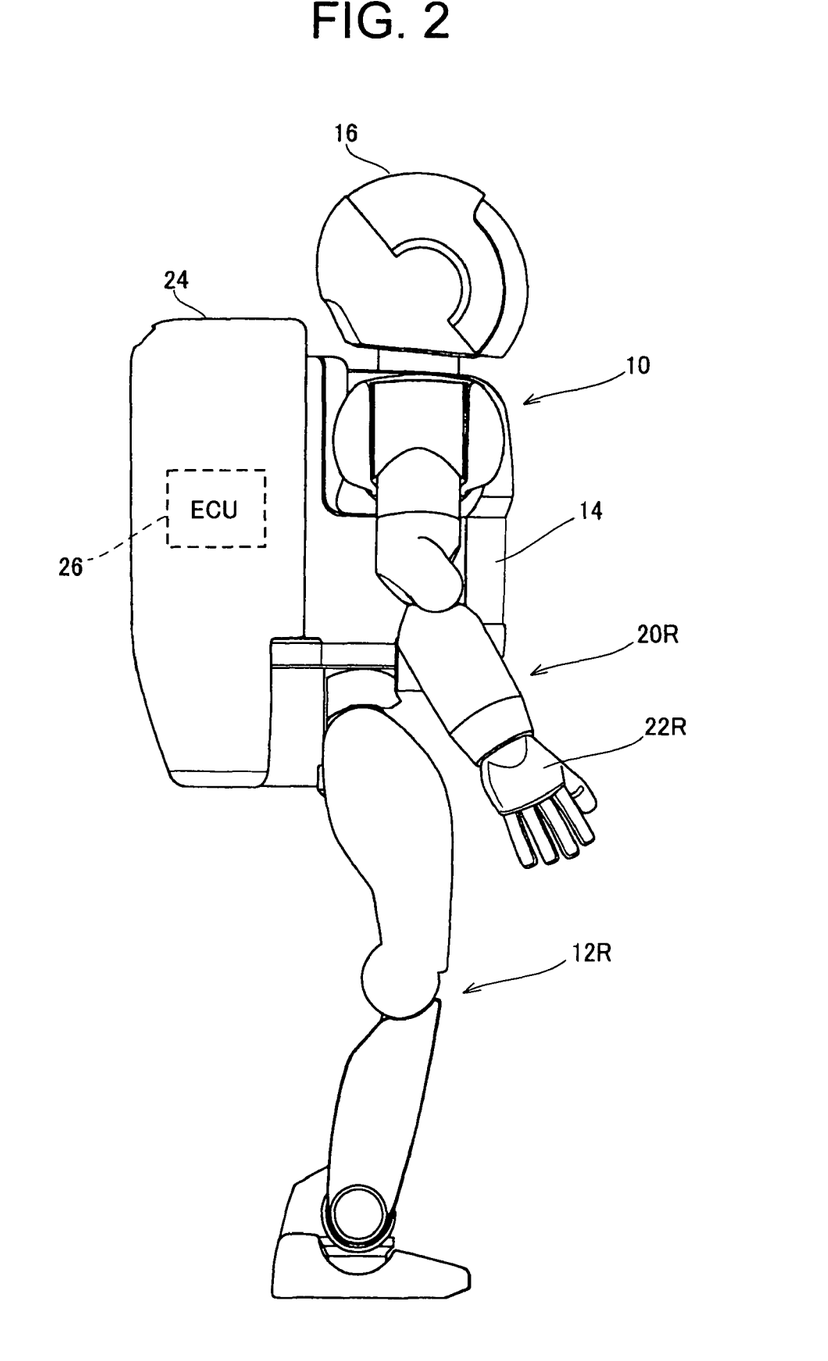
FIG. 2 is a side view of the robot shown in FIG. 1.

FIG. 1 is a front view of a robot, specifically a legged mobile robot, for which the control system according to an embodiment of this invention is applied and FIG. 2 is a side view of the robot shown in FIG. 1. A biped humanoid robot having two legs and two arms is taken here as an example of a legged mobile robot.

As shown in FIG. 1, a legged mobile robot (hereinafter called simply "robot") 10 is equipped with right and left legs 12R, 12L (R and L indicating the right and left sides; hereinafter the same) that are connected to the lower portion of a body 14. A head 16 is connected to the body 14 at its upper portion and right and left arms 20R, 20L are connected one to either side of the body 14. Hands (end effectors) 22R, 22L are attached to the distal ends of the arms 20R, 20L. A housing unit 24 is mounted on the back of the body 14, as shown in FIG. 2, and accommodates an electronic control unit (ECU) 26, a battery (not shown) and other components.

Figure 3:
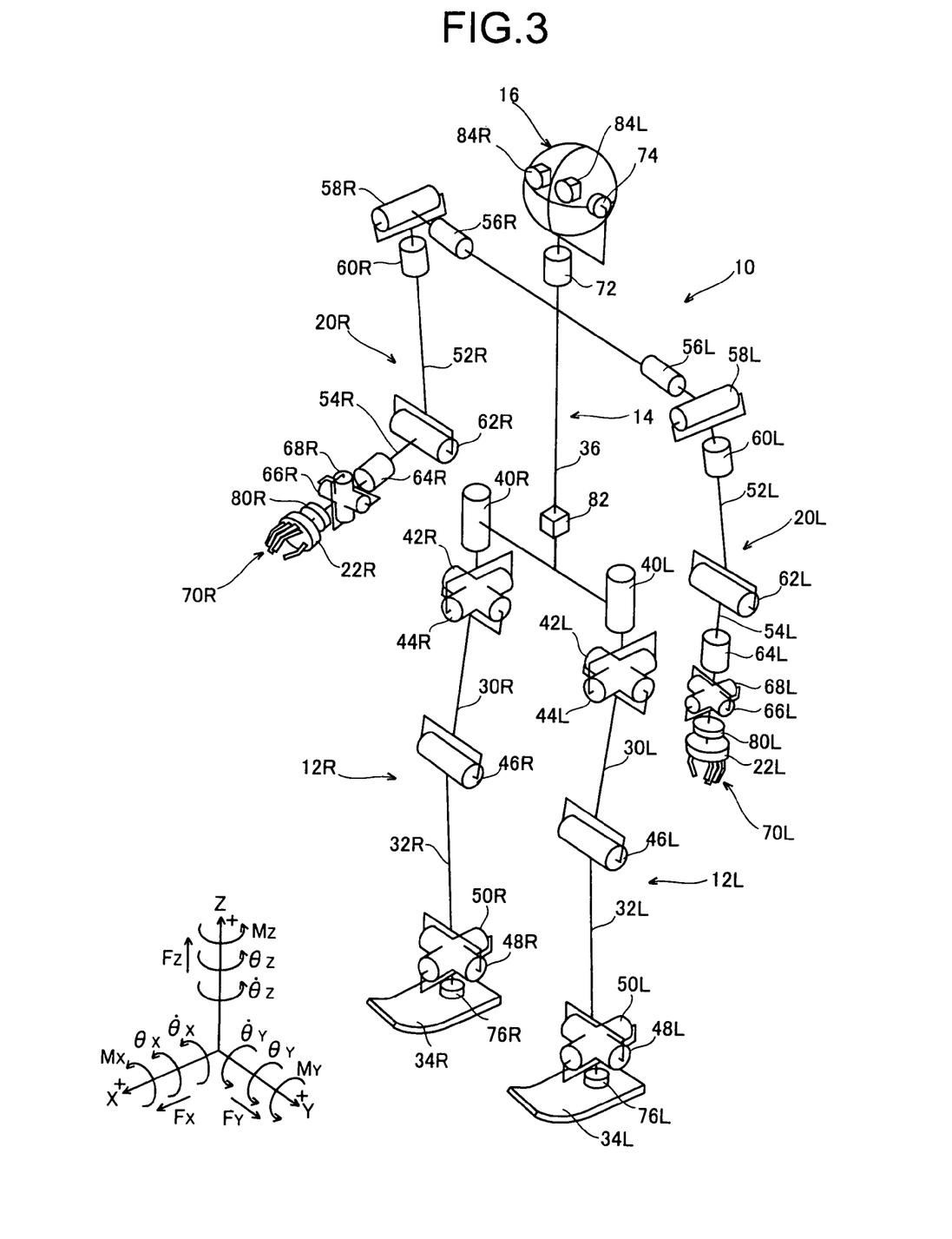
FIG. 3 is an explanatory diagram showing a skeletonized view of the robot shown in FIG. 1.

FIG. 3 is an explanatory diagram showing a skeletonized view of the robot 10 shown in FIG. 1. The internal structures of the robot 10 will be explained with reference to this drawing, with primary focus on the joints.

The right and left legs 12R, 12L are equipped with thigh links 30R, 30L, shank links 32R, 32L and feet 34R, 34L. The thigh links 30R, 30L are connected through hip (crotch) joints to the body 14, which is represented in FIG. 3 simply by a body link 36. The thigh links 30R, 30L and shank links 32R, 32L are interconnected by knee joints and the shank links 32R, 32L and feet 34R, 34L are interconnected by ankle joints.

The hip joints are constituted of rotary shafts 40R, 40L rotating about the Z axis (yaw axis; specifically in the height direction of the robot 10), rotary shafts 42R, 42L rotating about the Y axis (pitch axis; specifically in the lateral direction of the robot 10), and rotary shafts 44R, 44L rotating about the X axis (roll axis; specifically in the back-and-forth direction of the robot 10). The right and left hip joints are each provided with 3 degrees of freedom.

It should be noted that in this embodiment the upside of the vertical axis is a plus direction of the Z axis and the downside thereof is a minus direction. Similarly, the fore of the robot 10 is a plus direction of the X axis and the rear thereof is a minus direction, and the left side (in the advancing direction) of the robot 10 is a plus direction of the Y axis and the right side thereof is a minus direction.

The knee joints are constituted of rotary shafts 46R, 46L rotating about the Y axis and each provided with 1 degree of freedom. The ankle joints are constituted of rotary shafts 48R, 48L rotating about the Y axis and rotary shafts 50R, 50L rotating about the X axis and each provided with 2 degrees of freedom. Thus the right and left legs 12R, 12L are each provided with 6 rotary shafts (6 degrees of freedom) constituting the three joints, i.e., the whole legs are provided with a total of 12 rotary shafts.

The legs 12R, 12L are driven by actuators (not shown; hereinafter called "leg actuators"). Specifically, the leg actuators comprise 12 electric motors disposed at appropriate positions in the body 14 and legs 12R, 12L and drive the 12 rotary shafts individually or separately. Owing to the foregoing configuration, the legs 12R, 12L can be imparted with desired movements by controlling the operation of the leg actuators to drive the rotary shafts to appropriate angles.

The right and left arms 20R, 20L are equipped with upper arm links 52R, 52L, forearm links 54R, 54L and the hands 22R, 22L. The upper arm links 52R, 52L are connected through shoulder joints to the body 14. The upper arm links 52R, 52L and forearm links 54R, 54L are interconnected by elbow joints and the forearm links 54R, 54L and hands 22R, 22L are interconnected by wrist joints.

The shoulder joints are constituted of rotary shafts 56R, 56L rotating about the Y axis, rotary shafts 58R, 58L rotating about the X axis and rotary shafts 60R, 60L rotating about the Z axis and each provided with 3 degrees of freedom. The elbow joints are constituted of rotary shafts 62R, 62L rotating about the Y axis and each provided with 1 degree of freedom. The wrist joints are constituted of rotary shafts 64R, 64L rotating about the Z axis, rotary shafts 66R, 66L rotating about the Y axis and rotary shafts 68R, 68L rotating about the X axis and each provided with 3 degrees of freedom. Thus the right and left arms 20R, 20L are each provided with 7 rotary shafts (7 degrees of freedom) constituting the three joints, i.e., the whole arms are provided with a total of 14 rotary shafts.

Similar to the legs 12R, 12L, the arms 20R, 20L are also driven by actuators (not shown; hereinafter called "arm actuators"). Specifically, the arm actuators comprise 14 electric motors disposed at appropriate positions in the body 14 and arms 20R, 20L and drive the 14 rotary shafts individually or separately. Owing to the foregoing configuration, the arms 20R, 20L can be imparted with desired movements by controlling the operation of the arm actuators to drive the rotary shafts to appropriate angles.

The each hand 22R (22L) is equipped with five fingers 70R (70L). Each of the fingers 70R, 70L is driven by a drive mechanism (not shown) having actuators and can be freely operated such that the robot 1 does works, such as grasping an object, by the fingers 70R, 70L in cooperation with the movement of arms 20R, 20L.

The head 16 is connected to the body 14 through a neck joint. The neck joint is constituted of a rotary shaft 72 rotating about the Z axis and a rotary shaft 74 rotating about the Y axis and is provided with 2 degrees of freedom. The rotary shafts 72 and 74 are also driven by actuators (not shown; hereinafter called "head actuators") individually or separately. Thus the head 16 can be orientated in a desired direction by controlling the operation of the head actuators to drive the rotary shafts 72 and 74 to appropriate angles.

Six-axis force sensors 76R, 76L are attached to the right and left legs 12R, 12L (specifically, between the feet 34R, 34L and foot joints), respectively. The six-axis force sensor 76R attached to the right leg 12R will be called "right leg force sensor" and the sensor 76L attached to the left leg 12L "left leg force sensor". The right leg force sensor 76R produces an output or a signal indicative of the floor reaction force components FxRF, FyRF and FzRF of three directions and the moment components MxRF, MyRF and MzRF of three directions acting on the right leg 12R (specifically, acting on the robot 10 through the right leg 12R) from the surface of contact. The left leg force sensor 76L produces an output or a signal indicative of the floor reaction force components FxLF, FyLF and FzLF of three directions and the moment components MxLF, MyLF and MzLF of three directions acting on the left leg 12L (specifically, acting on the robot 10 through the left leg 12L) from the surface of contact.

Similar six-axis force sensors 80R, 80L are attached to the right and left arms 20R, 20L (specifically, between the hands 22R, 22L and wrist joints), respectively. The six-axis force sensor 80R attached to the right arm 20R will be called "right arm force sensor" and the sensor 80L attached to the left arm 20L "left arm force sensor". The right arm force sensor 80R produces an output or a signal indicative of the external force (object reaction force) components FxRH, FyRH and FzRH of three directions and the moment components MxRH, MyRH and MzRH of three directions acting on the right arm 20R (specifically, acting on the robot 10 through the right arm 20R), and the left arm force sensor 80L produces an output or a signal indicative of the external force (object reaction force) components FxLH, FyLH and FzLH of three directions and the moment components MxLH, MyLH and MzLH of three directions acting on the left arm 20L (specifically, acting on the robot 10 through the left arm 20L).

The above-mentioned six-axis force sensors 76R, 76L, 80R, 80L produce outputs such that the force components in the plus direction of the X, Y and Z axes are positive values and those in the minus direction are negative values.

An inclination sensor 82 is installed on the body 14 and produces an output or a signal representing at least one of the inclination or tilt angle of the body 14 relative to the vertical axis and the angular velocity thereof, i.e., representing at least one quantity of state such as the inclination or posture of the body 14. The interior of the head 16 is mounted therein with right and left CCD cameras 84R, 84L that take images of the surrounding of the robot 10 and simultaneously output the taken images.

The outputs from the sensors and the cameras are sent to the ECU 26 shown in FIG. 2. The ECU 26 comprises a microcomputer having a CPU, an input/output circuit, a ROM, a RAM and the like (neither shown).

Figure 4:
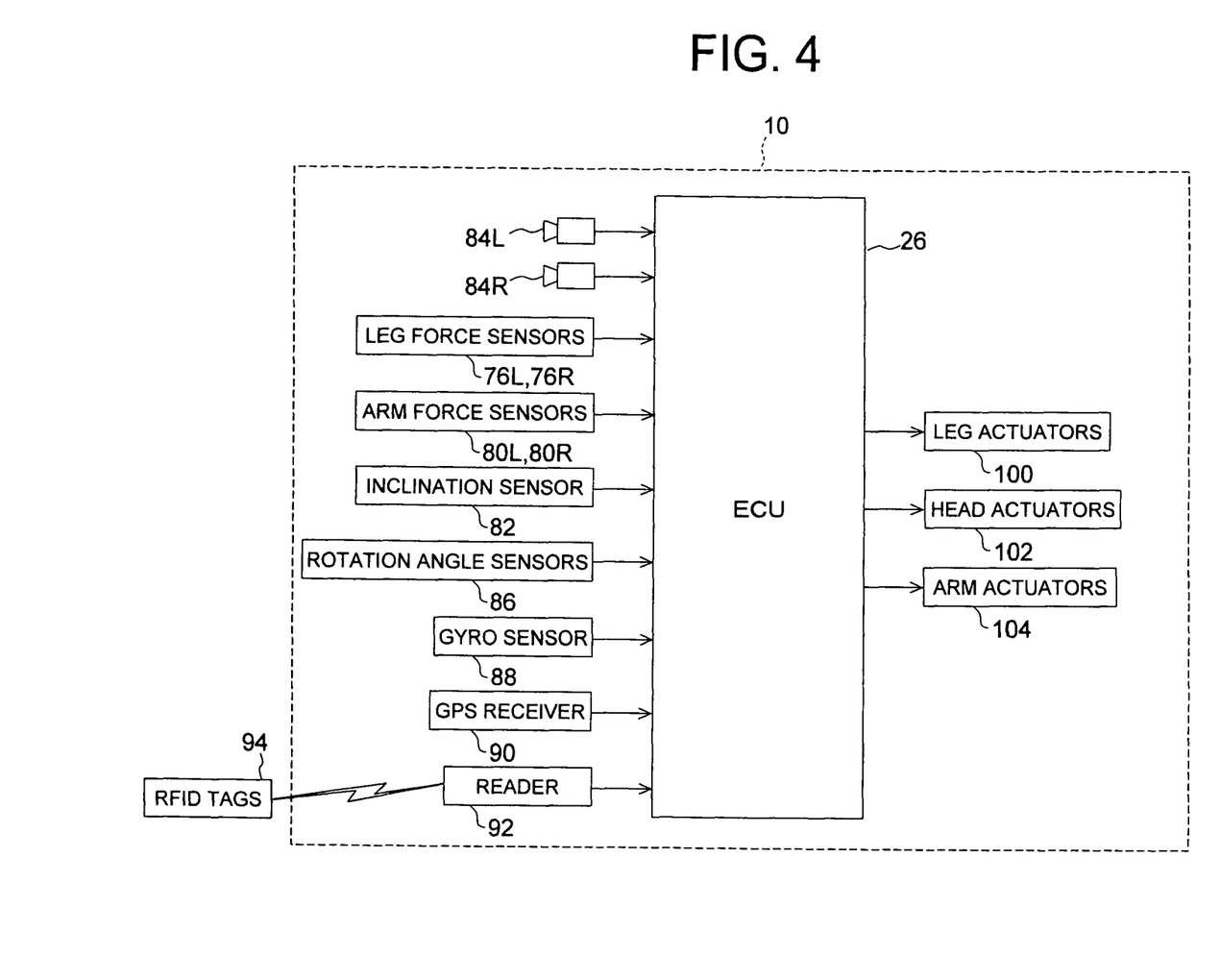
FIG. 4 is a block diagram showing the structure of the robot shown in FIG. 1 with focus on input/output of an ECU.

FIG. 4 is a block diagram of the structure of the robot 10 with focus on the input/output of the ECU 26.

As shown, the robot 10 equipped with the sensors and cameras mentioned in the foregoing is further equipped with rotation angle sensors 86, a gyro sensor 88, a GPS receiver 90 and a reader 92. The rotation angle sensors 86 are constituted of a number of rotary encoders that produce outputs or signals indicative of the rotation angles of the aforesaid rotary shafts. The gyro sensor 88 produces an output or signal indicative of the direction and distance of movement of the robot 10. The outputs of the rotation angle sensors 86 and gyro sensor 88 are sent to the ECU 26.

The GPS receiver 90 receives radio signals transmitted from satellites to acquire information on the position (latitude and longitude) of the robot 10 and outputs the position information to the ECU 26. The reader 92 inputs and reads, through wireless system, identification (ID) information stored in RFID (Radio Frequency ID) tags 94, i.e., information identifying the persons bearing the tags through wireless system and outputs it to the ECU 26.

The ECU 26 controls walking based on the outputs of the leg force sensors 76R, 76L, inclination sensor 82, and rotation angle sensors 86. Specifically, it controls the robot 10 to move or walk by controlling the operation of leg actuators (designated by the reference numeral 100) to drive the legs 12R, 12L. Concomitantly with the walking and other control, the ECU 26 also controls the operation of head actuators (designated by reference numeral 102) to regulate the orientation of the head 16. The walking control of the robot 10 is performed in accordance with the teaching of Japanese Laid-Open Patent Application No. Hei 10(1998)-277969. The control will not be explained in detail here, since it is not directly related to the gist of this invention.

The ECU 26 further controls handshaking based on the outputs of the arm force sensors 80R, 80L, CCD cameras 84R, 84L, gyro sensor 88, GPS receiver 90 and reader 92. Specifically, it controls the operation of the aforesaid arm actuators (designated by reference numeral 104) to produce a handshake posture and, for maintaining postural stability during handshaking, controls the operation of the leg actuators 100 so as to move the robot 10.

Figure 5:
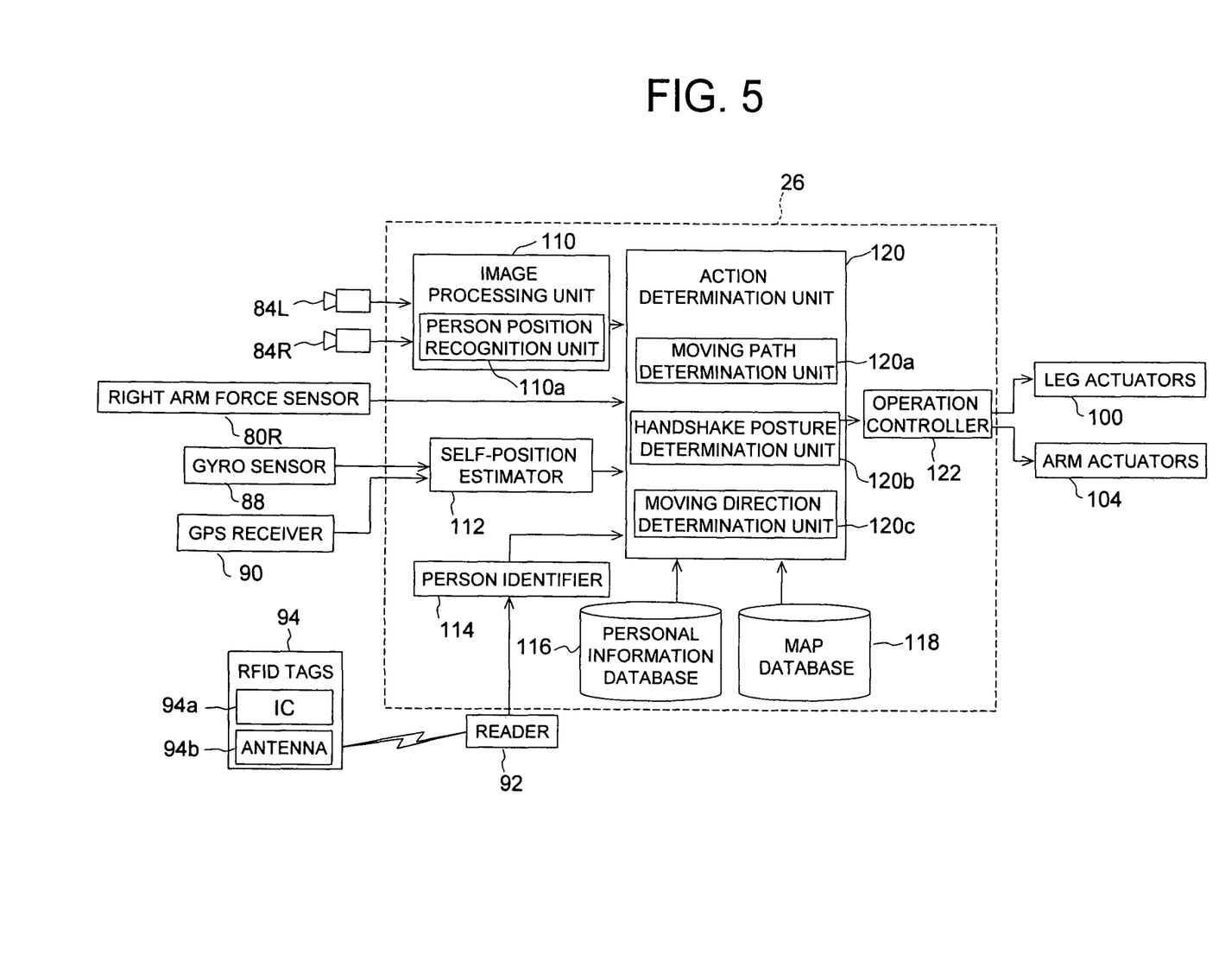
FIG. 5 is a block diagram showing handshake control processing executed in the ECU shown in FIG. 4.

FIG. 5 is a block diagram showing the handshake control processing executed in the ECU 26. The following explanation is made for handshaking with the hand of the right arm 20R.

As shown in FIG. 5, the ECU 26 is equipped with an image processing unit 110, self-position estimator 112, person identifier 114, personal information database 116, map database 118, action determination unit 120, and operation controller 122.

The image processing unit 110 is equipped with a person position recognition unit 110a. The person position recognition unit 110a inputs images taken at the same instant by the CCD cameras 84R, 84L and generates a distance image based on the parallax of the taken images. It further inputs from the CCD cameras images taken at different instants and based on the difference between them, generates a difference image comprising extracted regions where movement occurred. It then recognizes the position of and distance to any person present in the field of vision based on the generated distance image and difference image. This recognition of a person based on an image is comprehensively described in, for example, Japanese Laid-Open Patent Application No. 2004-302905. A detailed explanation of the technique will therefore not be set out here.

The self-position estimator 112 estimates the current position of the robot 10 based on position information inputted from the GPS receiver 90. When the GPS receiver 90 is not able to receive radio signals transmitted from satellites, it estimates the current position based on the movement direction and distance detected by the gyro sensor 88.

The person identifier 114 identifies the person, more specifically, the person recognized by the person position recognition unit 110a, based on the identification information of the RFID tag 94 borne by the person. Each RFID tag 94 includes an IC 94a storing ID information and an antenna 94b for transmitting the ID information to the reader 92 through wireless system. The RFID tags 94 are borne by a number of persons and the tag borne by each person stores information specific to that person.

The personal information database 116 stores personal information on the people who carry the RFID tags 94. The personal information includes at least the height and gender of the person concerned. The map database 118 contains map information regarding the area in which the robot 10 moves.

The action determination unit 120 is equipped with a moving path determination unit 120a, a handshake posture determination unit 120b, and a moving direction determination unit 120c.

The moving path determination unit 120a determines a path along which the robot 10 is to move, i.e., the path for approaching the person based on the position of the person recognized by the person position recognition unit 110a and the map information contained in the map database 118.

The handshake posture determination unit 120b determines or changes the handshake posture, more specifically, posture of the right arm 20R based on the position of the person recognized by the person position recognition unit 110a and the personal information, more precisely, height of the person associated with the ID information acquired from the personal information database 116. The moving direction determination unit 120c determines the direction in which the robot 10 is to move based on the output of the right arm force sensor 80R during handshaking.

The action determined in the action determination unit 120 is sent to the operation controller 122. The operation controller 122 controls the operation of the leg actuators 100 and arm actuators 104 in accordance with the determined action.

The handshaking control performed by the ECU 26 will now be explained with reference to the flowchart of FIG. 6, focusing particularly on the processing executed by the action determination unit 120.

In S10, the moving path for making the robot 10 approach the person recognized by the person position recognition unit 110a is determined and the operation of the leg actuators 100 is controlled to move the robot 10 to approach the person along the determined moving path.

Next, in S12, it is determined whether the robot 10 has approached to within a predetermined distance of the person. When the result in S12 is NO, the program returns to S10 and movement is continued. When the result in S12 is YES, the program goes to S14, in which the operation of the leg actuators 100 is controlled to stop movement, and then to S16, in which the operation of the right arm actuators 104 is controlled to produce a handshake posture (to extend the right arm 20R toward the person). FIG. 7 shows the robot 10 upon having approached to within the predetermined distance (designated D) of the person (designated 130) and assumed a handshake posture.

In S16, the robot 10 is controlled to produce the handshake posture. More specifically, the posture of the right arm 20R is determined or changed based on the position of the person recognized by the person position recognition unit 110a and the personal information (height) acquired from the personal information database 116. Specifically, when the separation between the robot 10 and the person within the predetermined distance is long, the posture of the right arm 20R is determined so as to position the hand 22R farther forward (in the plus direction of the X axis) than when the separation is short. Further, when the person whose hand is to be shaken is tall, the posture of the right arm 20R is determined so as to position the hand 22R higher (in the plus direction of the Z axis) than when the person is short.

Next, in S18, it is determined whether the absolute value of at least one of the external force components FxRH, FyRH, and FzRH of three directions detected by the right arm force sensor 80R exceeds a predetermined value #F. When the robot 10 shakes hands with the person 130, its right arm 20R receives a considerable external force. The check made in S18 therefore amounts to determining whether the robot 10 is shaking hands. The predetermined value #F can be set to a relatively small one (positive value) sufficient for enabling detection of contact of the hand 22R with the hand of a person.

When the result in S18 is NO, the program returns to S16. This is to delay the start of handshaking until the handshake posture has been adjusted to the position of (distance from)

the person. When the result in S18 is YES, the program goes to S20, in which posture stabilization control is executed. The posture stabilization control is conducted for preventing destabilization of the posture of the robot 10 owing to external force acting on the right arm 20R. It is characterized in being control of the operation of the leg actuators 100 based on the detected external force, specifically control conducted in response to an external force exceeding the predetermined value for maintaining balance by moving the robot 10 in the same direction as the direction of external force (i.e., in the direction of easing the external force acting on the right arm 20R).

Figure 8:
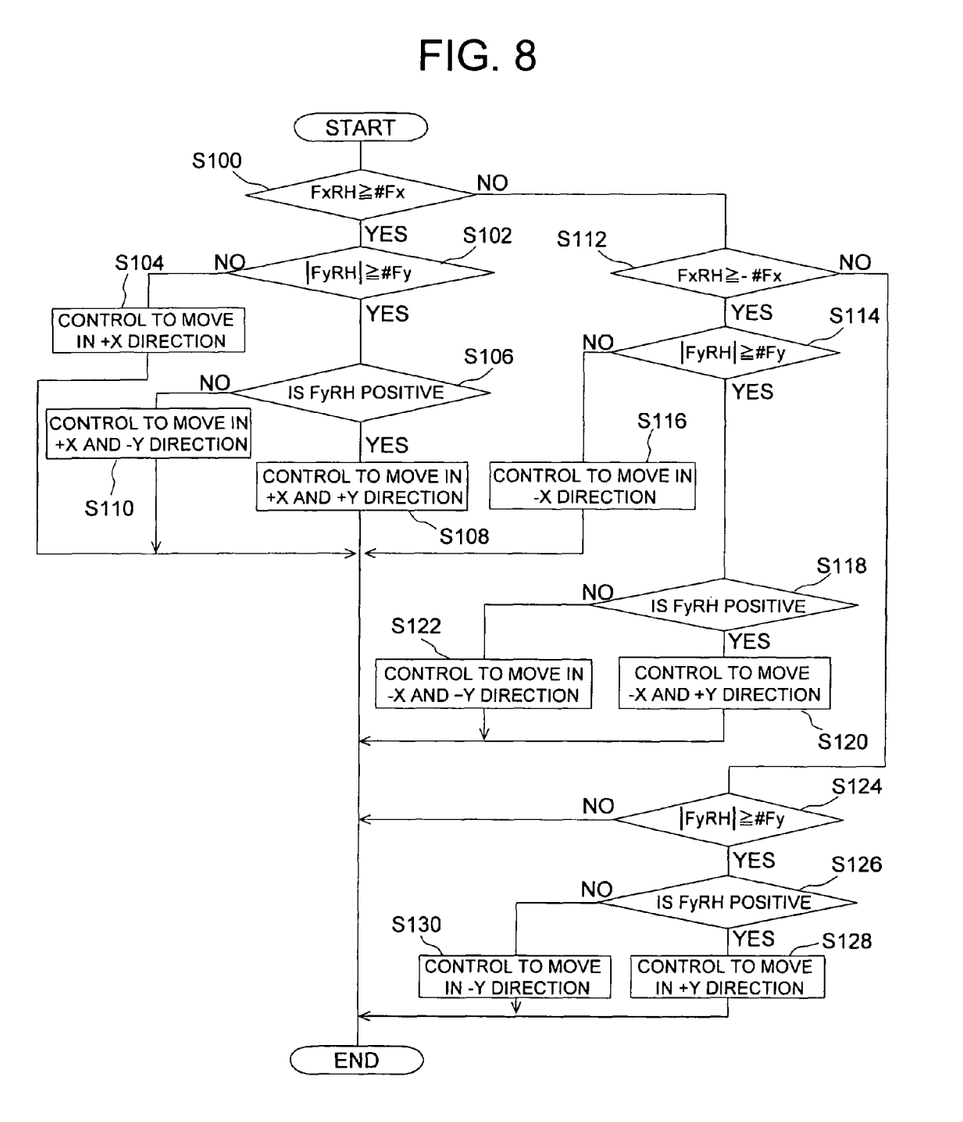
FIG. 8 is a flow chart (subroutine) showing processing of the posture stabilization control shown in the flow chart of FIG. 6.

FIG. 8 is a flow chart showing the processing procedures of the posture stabilization control.

Figure 9:
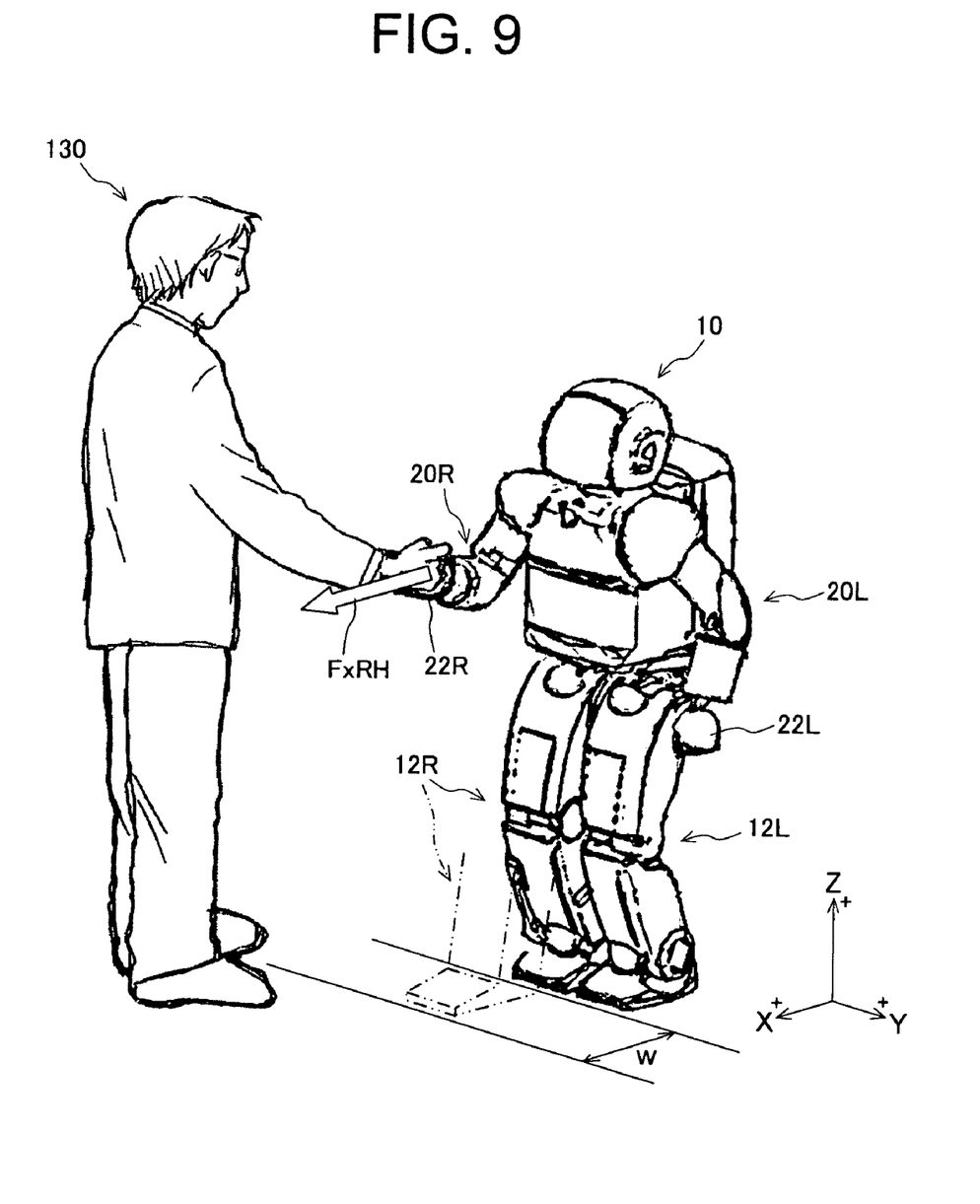
FIG. 9 is an explanatory view similar to FIG. 7 showing the processing of the flow chart of FIG. 8.

First, in S100, it is determined whether the X-direction component FxRH of the external force detected by the right arm force sensor 80R is equal to or greater than a predetermined value #Fx. In other words, it is determined whether the right arm 20R of the robot 10 is being pulled forward (in the plus direction of the X axis) as shown in FIG. 9 with a force equal to or greater than the predetermined value #Fx. The predetermined value #Fx is defined to be a (positive) value greater than the aforesaid predetermined value #F.

When the result in S100 is YES, the program goes to S102, in which it is determined whether the absolute value of the Y-direction component FyRH of the external force detected by the right arm force sensor 80R is equal to or greater than a predetermined value #Fy. In other words, it is determined whether the right arm 20R is being pushed leftward (in the plus direction of the Y axis) or rightward (in the minus direction of the Y axis) with a force equal to or greater than the predetermined value #Fy. The predetermined value #Fy is also defined to be a (positive) value greater than the predetermined value #F.

When the result in S102 is NO, the program goes to S104, in which the robot 10 is controlled to move in the plus X direction, i.e., in the same direction as the direction of the external force acting on the right arm 20R. Specifically, the operation of the leg actuators 100 is controlled to make the robot 10 step forward with either the left leg 12L or right leg 12R as shown in phantom in FIG. 9. The length of then step (designated w in FIG. 9) is varied according to the magnitude of FxRH, namely the step length w is increased with increasing FxRH.

When the result in S102 is NO, the program goes to S104, in which the robot 10 is controlled to move in the plus X direction, i.e., in the same direction as the direction of the external force acting on the right arm 20R. Specifically, the operation of the leg actuators 100 is controlled to make the robot 10 step forward with either the left leg 12L or right leg 12R as shown in phantom in FIG. 9. The length of the step (designated w in FIG. 9) is varied according to the magnitude of FxRH, namely the step length w is increased with increasing FxRH.

When the result in S100 is NO, the program goes to S112, in which it is determined whether the X-direction component FxRH is equal to or greater than a predetermined value −#Fx. In other words, it is determined whether the right arm 20R of the robot 10 is being pushed rearward (in the minus direction of the X axis) with a force equal to or greater than the predetermined value #Fx.

When the result in S112 is YES, the program goes to S114, in which, similarly to in S102, it is determined whether the absolute value of the Y-direction component FyRH is equal to or greater than the predetermined value #Fy. When the result in S114 is NO, the program goes to S116, in which the robot 10 is controlled to move in the minus X direction (is made to step rearward with the right leg 12R or left leg 12L).

When the result in S114 is YES, the program goes to S118, in which it is determined whether the Y-direction component FyRH is positive. When the result in S118 is YES, the robot is controlled to move in the minus X and plus Y direction (is made to step left-rearward with the left leg 12L) in S120, and when it is NO, the robot is controlled to move in the minus X and minus Y direction (is made to step right-rearward with the right leg 12R) in S122.

When the result in S112 is NO, the program goes to S124, in which it is determined whether the absolute value of the Y-direction component FyRH is equal to or greater than the predetermined value #Fy. When the result is NO, the remaining steps of the program are skipped (the robot 10 is not moved), and when it is YES, the program goes to S126, in which it is determined whether the Y-direction component FyRH is positive. When the result is YES, the robot 10 is controlled to move in the plus Y direction (is made to step leftward with the left leg 12L) in S128, and when it is NO, the robot is controlled to move in the minus Y direction (is made to step rightward with the right leg 12R) in S130.

Figure 6:
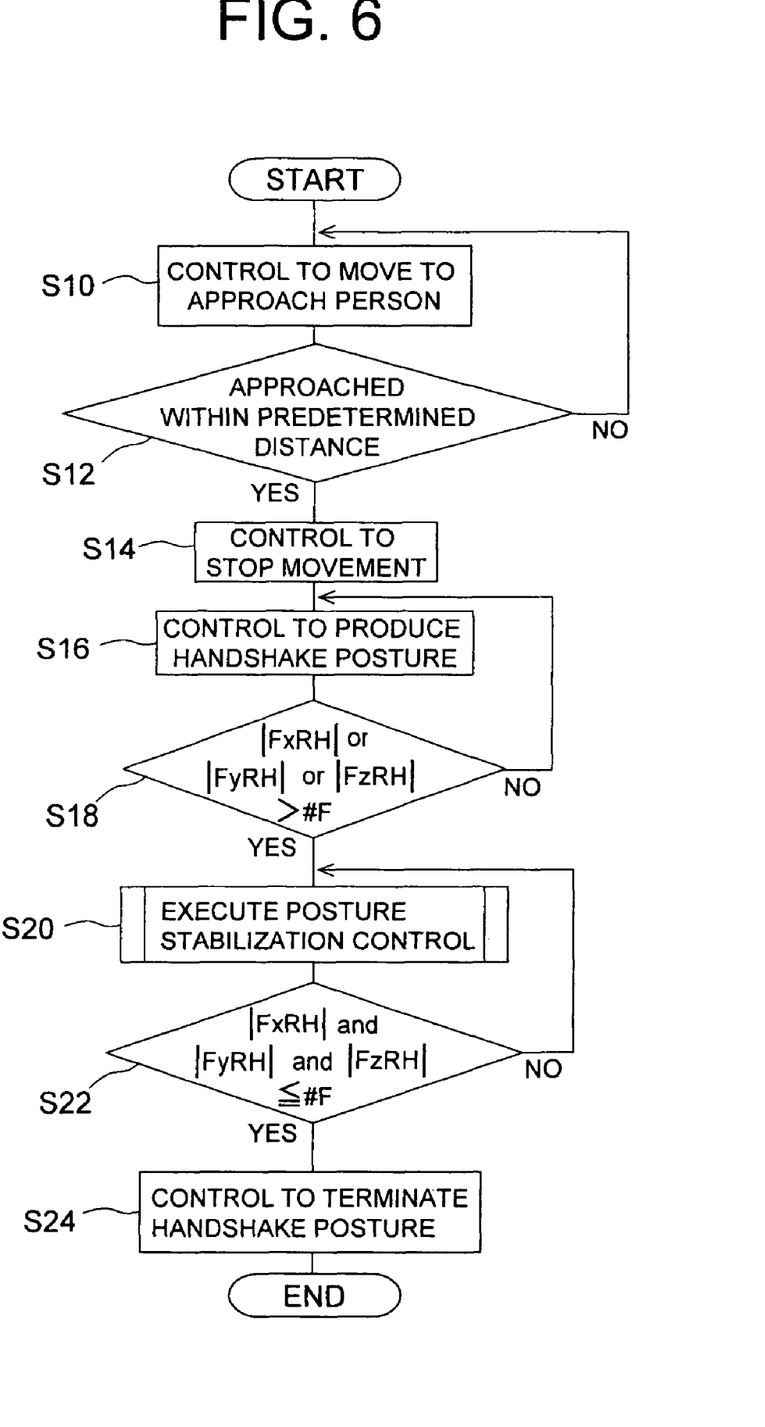
FIG. 6 is a flow chart (main routine) showing the operation of the handshake processing executed in the ECU shown in FIG. 4.
Figure 7:
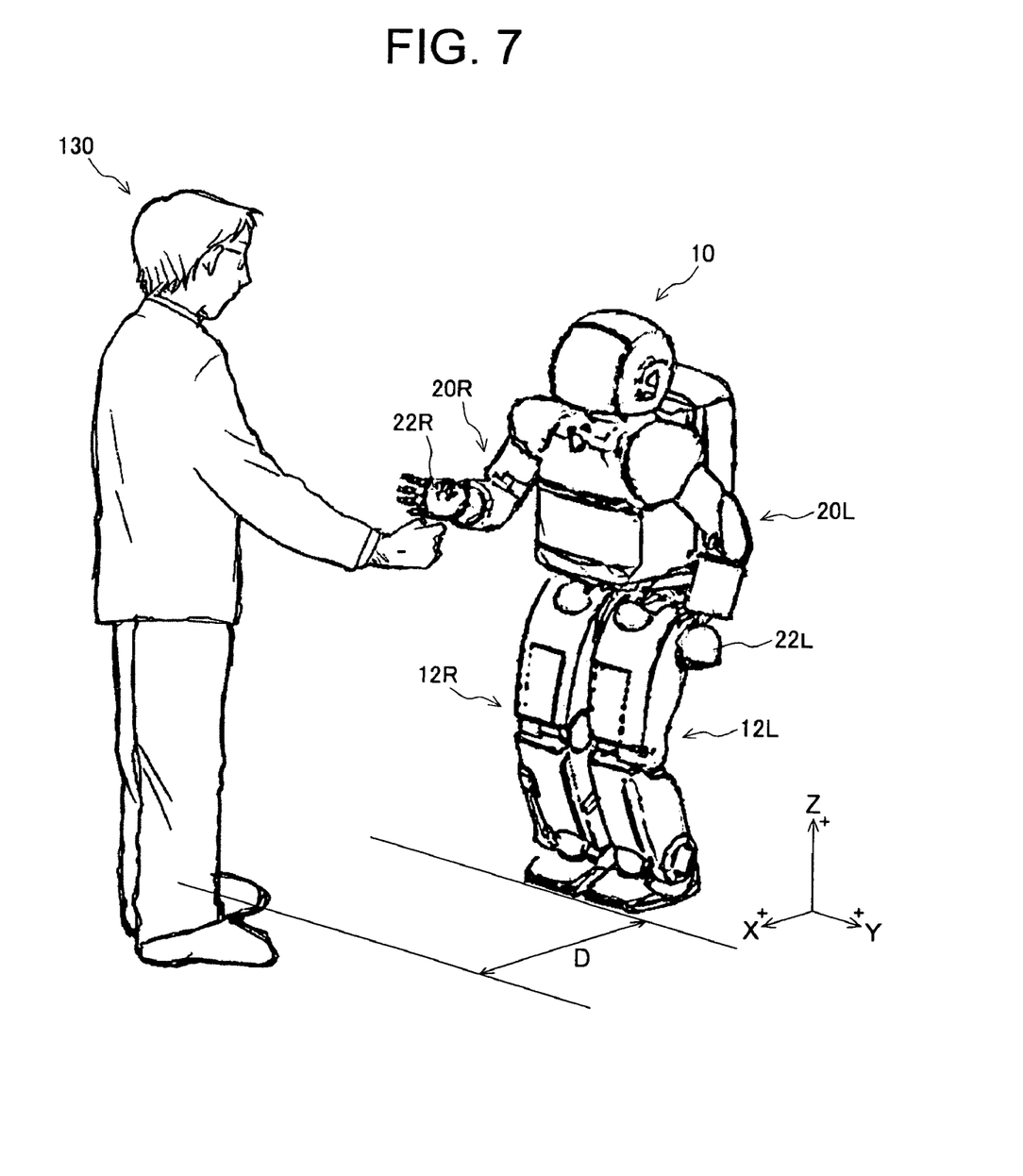
FIG. 7 is an explanatory view showing the processing of the flow chart of FIG. 6.

The explanation of the flowchart of FIG. 6 will be resumed.

Next, in S22, it is determined whether the absolute values of all of the external force components FxRH, FyRH, and FzRH of three directions are smaller than the predetermined value #F, i.e., whether handshaking has been completed. When the result in S22 is NO, the program returns to S20, so that the posture stabilization operation is continued, and when it is YES, the program goes to S24, in which the robot 10 is controlled to terminate the handshake posture.

The legged mobile robot control system according to the preferred embodiment set out in the foregoing is thus configured to control the operation of the actuators 104 that drive the right arm 20R so as to produce a handshake posture, detect the external force acting on the right arm 20R (external force acting on the right arm 20R during handshaking), and control the operation of the actuators 100 that drive the legs 12R, 12L based on the detected external force. The legged mobile robot control system can therefore achieve improved communication capability by enabling the robot 10 to shake hands with people and can maintain the stability of the posture of the robot 10 by counteracting the external force acting on the arm during handshaking to keep the robot in balance.

Of particular note is that the legged mobile robot control system is configured to respond when the X-direction component FxRH and Y-direction component FyRH of the detected external force exceed the predetermined values (#Fx, #Fy) by controlling the operation of the leg actuators 100 to move the robot 10 in the same direction as the direction of the external force. This enables the posture of the robot to be still more stably maintained during handshaking. In addition, it further improves the communication capability of the robot because the robot 10 also moves in response to external forces deliberately imparted by a person.

Moreover, the legged mobile robot control system is configured to recognize the position of the person with whom it is to shake hands based on the images taken by the CCD cameras 84R, 84L and determine or change its handshake posture in accordance with the recognized position of the person. This enables the robot to extend its arm so as to put the hand in a position where it is easy for the person to shake, thereby further enhancing communication capability.

In addition, the legged mobile robot control system is configured to determine or change the handshake posture of the robot 10 based on the ID information stored in the RFID tag 94. Specifically, it is configured to use the ID information to acquire the height (personal information) of the person with whom it is to shake hands from the personal information database 116 and determine or change the handshake posture based on the acquired height. This enables the robot to extend its arm so as to put the hand in the most suitable position for shaking by the person bearing the RFID tag 94, thereby further enhancing communication capability.

Japanese Patent Application No. 2004-361711 filed on Dec. 14, 2004 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a legged mobile robot having a body, legs and arms each connected to the body, leg actuators each driving the individual legs and arm actuators each driving the individual arms, the system comprising:
   a force sensor detecting an external force acting on each of the arms;
   an arm operation controller controlling operation of at least one of the arm actuators such that one of the arms produces a handshake posture; and
   a leg operation controller controlling operation of the leg actuators based on the detected external force acting on the one of the arms producing the handshake posture,
   wherein the leg operation controller controls operation of the leg actuators so as to move the robot in a same direction as that of the external force, when the detected external force exceeds a predetermined value, wherein the detected external force is caused by a person shaking a hand of the one of the arms.

2. The system according to claim 1, further comprising:
   a person position recognition unit recognizing a position of a person whose hand is to be shaken,
   wherein the arm operation controller determines or changes the handshake posture based on the recognized position of the person.

3. The system according to claim 1, further comprising:
   an ID information reader reading an ID information of a person whose hand is to be shaken,
   wherein the arm operation controller determines or changes the handshake posture based on the read ID information of the person.

4. The system according to claim 3, wherein the ID information includes a height of the person.

5. The system according to claim 1, wherein the leg operation controller controls operation of the leg actuators based on the detected external force acting on the one of the arms during handshaking such that a posture of the robot is stabilized.

6. The system according to claim 1, wherein the robot is a biped robot.

7. A method of controlling a legged mobile robot having a body, legs and arms each connected to the body, leg actuators each driving the individual legs and arm actuators each driving the individual arms, the method comprising the steps of:
   detecting an external force acting on each of the arms;
   controlling operation of at least one of the arm actuators such that one of the arms produces a handshake posture; and
   controlling operation of the leg actuators based on the detected external force acting on the one of the arms producing the handshake posture,
   wherein the step of leg operation controlling controls operation of the leg actuators so as to move the robot in a same direction as that of the external force, when the detected external force exceeds a predetermined value, wherein the detected external force is caused by a person shaking a hand of the one of the arms.

8. The method according to claim 7, further comprising the step of:
   recognizing a position of a person whose hand is to be shaken,
   wherein the step of arm operation controlling determines or changes the handshake posture based on the recognized position of the person.

9. The method according to claim 7, further comprising the step of:
   reading an ID information of a person whose hand is to be shaken,
   wherein the step of arm operation controlling determines or changes the handshake posture based on the read ID information of the person.

10. The method according to claim 9, wherein the ID information includes a height of the person.

11. The method according to claim 7, wherein the step of leg operation controlling controls operation of the leg actuators based on the detected external force acting on the one of the arms during handshaking such that a posture of the robot is stabilized.

12. The method according to claim 7, wherein the robot is a biped robot.

* * * * *